(12) United States Patent
Rezvani

(10) Patent No.: US 6,460,826 B1
(45) Date of Patent: Oct. 8, 2002

(54) CARTRIDGE VALVE

(75) Inventor: Nader Rezvani, Gaston, OR (US)

(73) Assignee: DCI International, Inc., Newberg, OR (US)

( * ) Notice: Subject to any disclaimer, the term of this patent is extended or adjusted under 35 U.S.C. 154(b) by 0 days.

(21) Appl. No.: 09/226,225

(22) Filed: Jan. 7, 1999

Related U.S. Application Data

(60) Provisional application No. 60/070,803, filed on Jan. 8, 1998.

(51) Int. Cl.[7] ............................................. F16K 31/00
(52) U.S. Cl. .................... 251/291; 137/271; 137/454.2
(58) Field of Search ......................... 137/271, 454.2, 137/454.5, 454.6; 251/128, 291, 292; 285/402

(56) References Cited

U.S. PATENT DOCUMENTS

| 712,929 | A | * | 11/1902 | Hedstrom | 137/454.2 |
|---|---|---|---|---|---|
| 2,107,165 | A | * | 2/1938 | Rice | 222/400.7 |
| 2,987,080 | A | * | 6/1961 | Chandler et al. | 137/798 |
| 3,115,150 | A | * | 12/1963 | Sariotti et al. | 137/240 |
| 3,117,587 | A | * | 1/1964 | Willinger | 137/315 |
| 4,201,366 | A | * | 5/1980 | Danko et al. | 251/335.3 |
| 4,258,741 | A | * | 3/1981 | Roger | 137/270 |
| 4,262,692 | A | * | 4/1981 | Sampson | 137/433 |
| 4,305,421 | A | * | 12/1981 | Fallon | 137/322 |
| 4,416,644 | A | * | 11/1983 | Kulischenko et al. | 464/52 |
| 4,460,012 | A | * | 7/1984 | Koumi et al. | 137/454.6 |
| 4,513,779 | A | * | 4/1985 | Owoc et al. | 137/556 |
| 5,806,572 | A | * | 9/1998 | Voller | 141/10 |
| 5,871,471 | A | * | 2/1999 | Ryan et al. | 604/167 |
| 5,975,116 | A | * | 11/1999 | Rosas et al. | 137/315 |

FOREIGN PATENT DOCUMENTS

| FR | 2308040 | * | 11/1976 | 251/291 |
|---|---|---|---|---|

* cited by examiner

*Primary Examiner*—Steven O. Douglas
*Assistant Examiner*—Peter deVore
(74) *Attorney, Agent, or Firm*—TraskBritt

(57) ABSTRACT

A cartridge valve includes a body element adapted for mounting to a panel by jam nuts and including a chamber adapted to receive a core element, the chamber and core element being constructed and arranged to effect a bayonet-type connection, whereby the core element may be selectively installed or removed from the chamber without tools by means of sequential axial and radial manipulations of the core element with respect to the valve body.

10 Claims, 4 Drawing Sheets

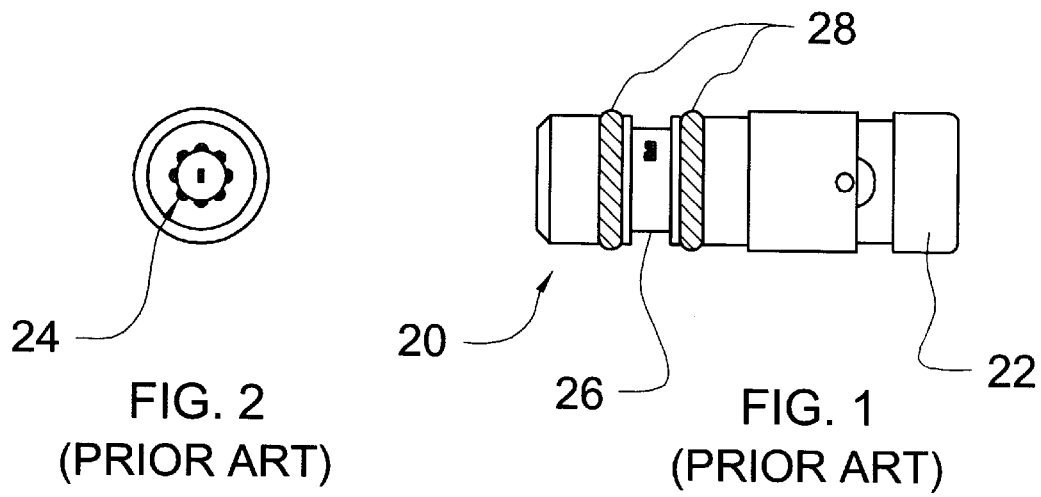
FIG. 2 (PRIOR ART)
FIG. 1 (PRIOR ART)
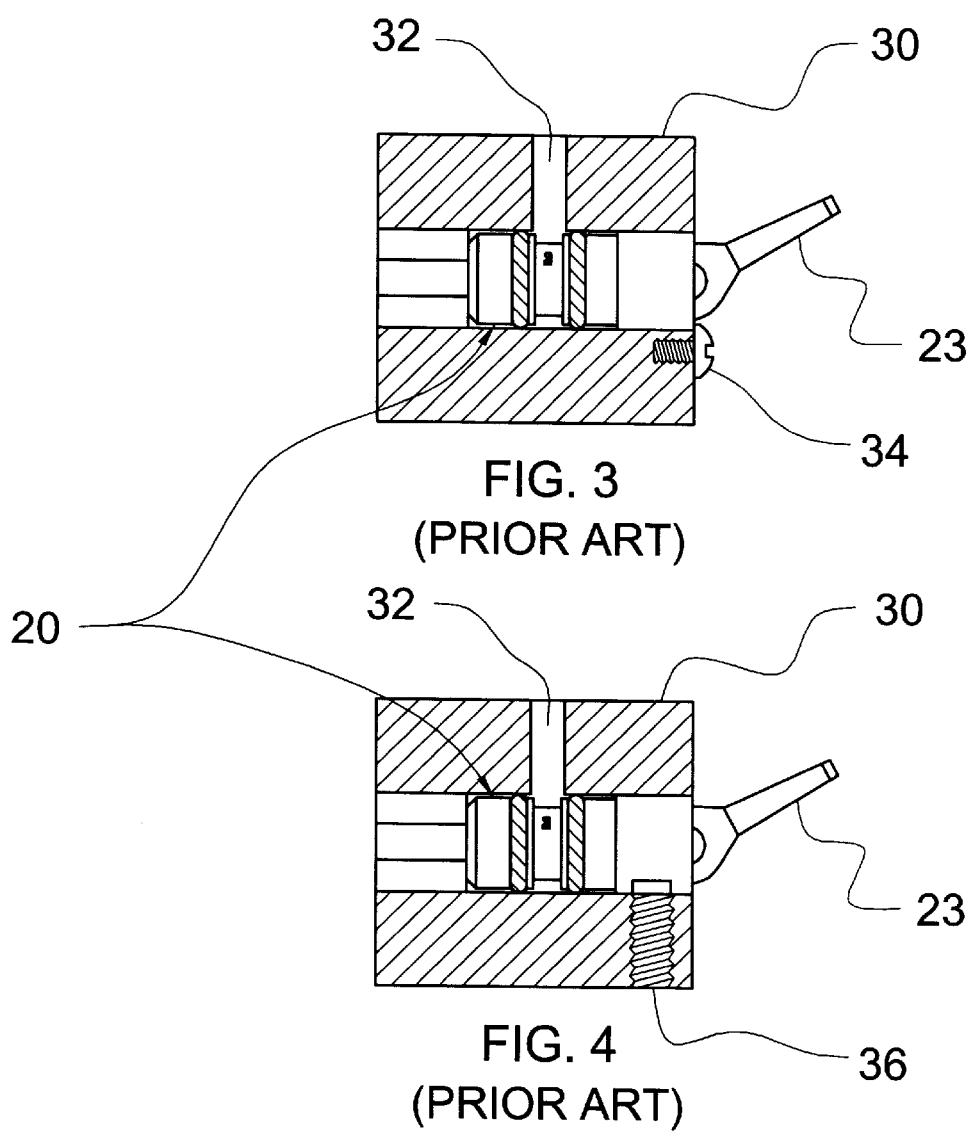
FIG. 3 (PRIOR ART)
FIG. 4 (PRIOR ART)

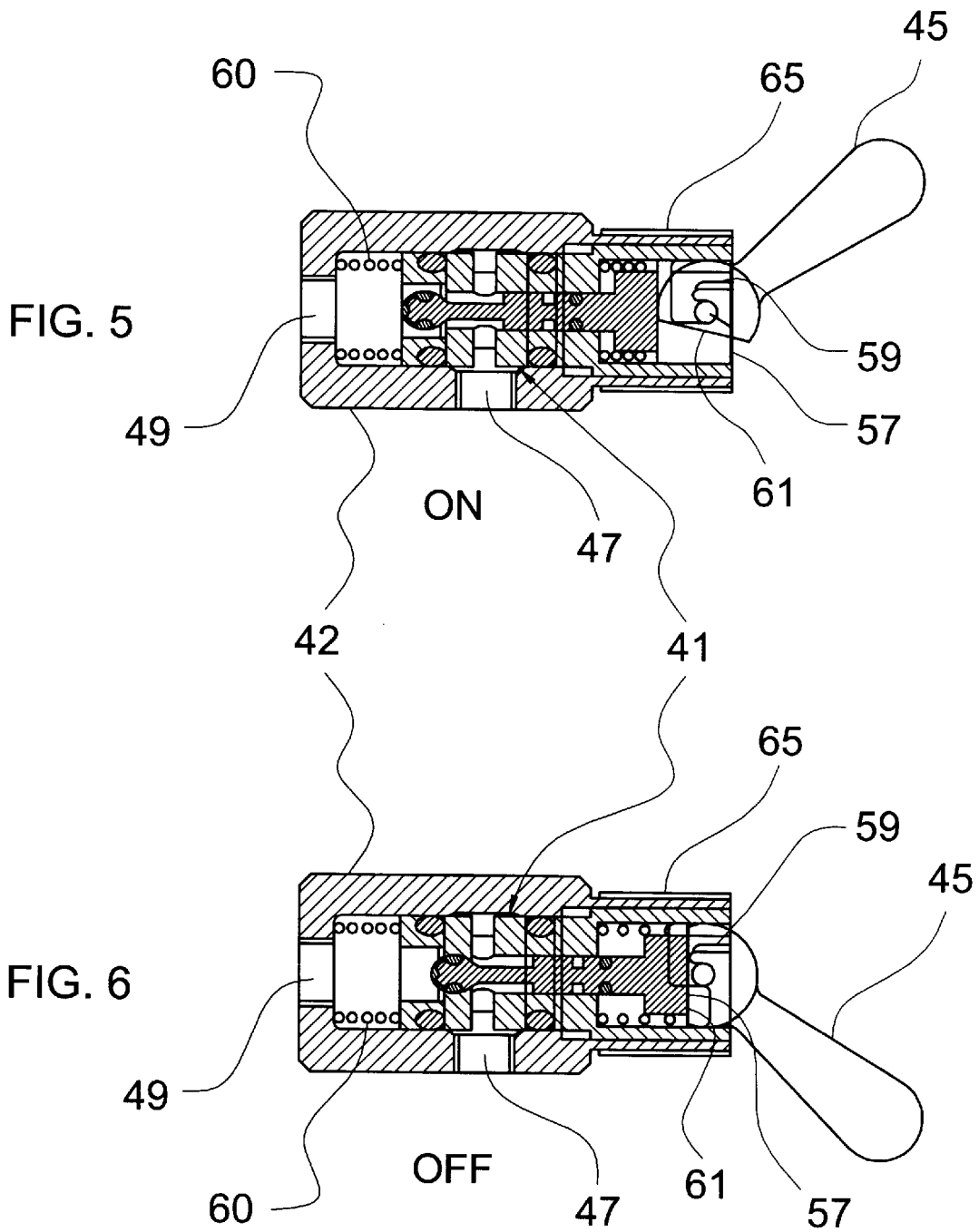

CARTRIDGE VALVE

BACKGROUND OF THE INVENTION

PRIORITY CLAIM

This application claims the priority of U.S. Provisional Patent Application Serial No. 60/070,803, filed Jan. 8, 1998 for "CARTRIDGE VALVE."

FIELD OF THE INVENTION

This invention pertains to valves, notably cartridge-type pneumatic/hydraulic valves. It is particularly directed to an improved such valve useful for dental equipment.

STATE OF THE ART

Cartridge valves are commonly used in connection with dental equipment, as well as for other applications. FIGS. 1 through 4 illustrate typical such valves and the manner in which they are conventionally mounted in association with equipment. A common inconvenience experienced with available cartridge valves is the requirement for a tool of some kind to release the core assembly (cartridge) of the valve for servicing. Other types of toggle valves, which may perform functions similar to those of cartridge valves, are typically mounted in panels by means of jam nuts. While such other toggle valves are in common use, they are less desirable for many applications than are cartridge valves. Moreover, replacement of such valves requires the disconnection of fluid supply lines. It is believed that the cartridge valves currently available, which might otherwise be useful in dental equipment, are not appropriately structured for panel mounting with jam nuts; they are thus not directly interchangeable with the toggle valves already in place in the field.

SUMMARY OF THE INVENTION

According to this invention, a cartridge valve is constructed such that its core assembly is removable from the valve body without the use of a tool. Ideally, the core assembly is removable by simply pressing it axially inward with respect to the valve body, and rotating the core assembly radially to a release position. Preferred embodiments are constructed to mount to a panel by means of a jam nut threaded upon a terminal segment of the valve body near the actuation mechanism. Actuation may be by any of the mechanisms used in currently available valves; specifically including toggles, rollers and push buttons.

Generally, the invention comprises an improvement to cartridge valves of the type comprising a core assembly mounted within a valve body. The improvement comprises providing structure associated with the core assembly and the body, respectively, whereby the core may be selectively installed in and removed from the body by sequential axial and radial movements of the core with respect to the body. The valve body preferably further includes an extension constructed and arranged for insertion through an aperture of a panel structure. Ideally, the extension is approximately circular in cross section, and carries external threads. It thus constitutes means for mounting the valve body to the panel structure by means of jam nuts positioned on opposite sides of the panel structure. The core assembly may, for example, include a first coupling element and the valve body may carry a second coupling element, the first and second coupling elements being structured and arranged to provide a bayonet locking attachment of the core assembly within the valve body.

The first coupling element is preferably carried by the distal end of the core assembly and typically comprises a locking groove opening to the distal end, while the second coupling element comprises a structural element configured to register with the locking groove. In preferred embodiments, the locking groove is shaped generally as a "J" with a long leg opening to the distal end of the core assembly (cartridge), a transverse connecting leg at the proximal end of the long leg and a shorter leg spaced from the long leg and extending towards the distal end of the cartridge. The core assembly is then mounted within the chamber by registering the distal end of the long leg with the structural element, pushing the core assembly until the structural element is positioned within the transverse leg, turning the core assembly until the structural element registers with the shorter leg and causing the core assembly to move outwardly with respect to the chamber, whereby to register the structural element with the shorter leg towards the distal end of the cartridge. The structural element carried within the chamber of the valve body may comprise an indexing ball carried within a recess in the wall of the chamber.

According to highly preferred embodiments, the distal end of the core assembly carries a plurality of circumferentially spaced, "J"-shaped locking grooves structured and arranged such that at least one such groove will engage the second coupling mechanism when the core is rotated to any of a plurality of selected rotated positions with respect to the chamber. Ideally, the distal end of the core assembly caries four, evenly spaced locking grooves, and the second coupling mechanism comprises two structural elements projecting inwardly from the wall of the chamber to register with alternate such grooves.

A cartridge valve of this invention will thus generally comprise a body element having a distal end, a proximal end, an internal chamber defined by a chamber wall opening through the proximal end, an inlet port in open communication with the chamber and an outlet port spaced from the inlet port and in open communication with the chamber. The body element preferably includes an extension at its proximal end configured to enable mounting of the valve to a panel by means of jam nuts. The valve will further comprise a cartridge element, shaped and dimensioned for installation within the chamber. The cartridge element will ordinarily have a distal end and a proximal end carrying an actuator mechanism, a first sealing means disposed between the chamber wall and the cartridge element between the inlet port and the outlet port, respectively, and second sealing means disposed between the chamber wall and the cartridge element in a position to isolate both the inlet and outlet ports from the distal end of the chamber.

A bayonet locking system may be provided to couple the body element to the cartridge element, the locking system being structured and arranged to require push-turn-release manipulations of the cartridge element with respect to the chamber to install the cartridge element within the chamber and push-turn-pull manipulations of the cartridge element with respect to the chamber to remove the cartridge element from the chamber. The bayonet locking system may be structured and arranged to couple the cartridge element to the body element when the cartridge element is oriented in any of a plurality of selected rotated positions with respect to the chamber.

The actuator is generally operable between an ON position, which provides a fluid flow path between the inlet port and the outlet port through the cartridge element and an OFF position, which blocks fluid flow through the cartridge element. Valves of this invention may be provided with a plurality of interchangeable cartridge elements. Individual such cartridge elements may be distinct in at least one of actuation mechanism or internal configuration such that replacing one such cartridge element with another modifies the specific operation of the valve.

BRIEF DESCRIPTION OF THE DRAWINGS

In the drawings, which illustrate what is currently regarded as the best mode for carrying out the invention:

FIG. 1 is a side view of the internal stem portion, or core assembly, of a typical currently available commercial cartridge valve;

FIG. 2 is an end view of the core assembly of FIG. 1;

FIG. 3 is side view, partially in section, of an alternative currently available cartridge (core assembly) installed within a valve body, being fastened in place with a screw;

FIG. 4 is a view similar to FIG. 3, illustrating an alternative mounting mechanism;

FIG. 5 is an illustration, partially in section, of a cartridge valve of this invention with a toggle actuator shown in the "ON" position;

FIG. 6 is an illustration similar to FIG. 5, showing the valve in its "OFF" position;

DETAILED DESCRIPTION OF THE ILLUSTRATED EMBODIMENTS

Figure 8:
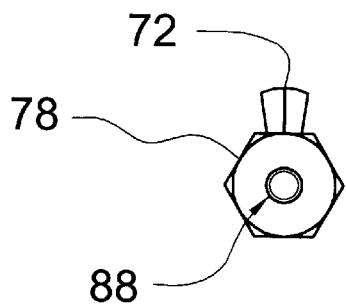
FIG. 8 is an end view of the assembly of FIG. 7.

FIGS. 1 and 2 illustrate a typical inner core assembly, generally 20, of a commercially available cartridge valve over which this invention provides an improvement. It is illustrated with a push button actuator 22, but other versions utilize toggle actuators 23 (See FIGS. 3 and 4) or equivalent mechanisms. The assembly characteristically includes an inlet port 24, which communicates with an annular groove 26 situated between spaced "O"-ring seals 28. The core assembly is mounted within a valve body, 30 (FIGS. 3 and 4). The annular groove 26 is brought into registration with an outlet port 32 by insertion of the core assembly 20 into the body 30. Fluid communication through the valve body is effected by operation of the actuator 23. The assembly may be held in association with the valve body 30 by means of a screw head 34 (FIG. 3) or a set screw 36 (FIG. 4).

FIGS. 5 and 6 illustrate an improved cartridge core assembly, generally 41, mounted within a valve body, generally 42. A toggle lever, 45 may be selectively positioned as illustrated between ON (FIG. 5) and OFF (FIG. 6) positions, thereby controlling the flow of gas or liquid fluid through the flow path between ports 47, 49. The core 41 is installed by inserting it into the body 42 axially. A rigid pin 57 functions as the axle for the toggle 45 and extends so that each of its ends enters a groove 59 milled into the body 42. The core 41 is pushed axially against a spring 60, and is then turned radially, and released to travel axially into the registered position 61 shown. Removal of the core is effected by reversing the installation procedure. Jam nuts (not shown) may be threaded onto a threaded segment 65 of the valve body 42.

Figure 7:
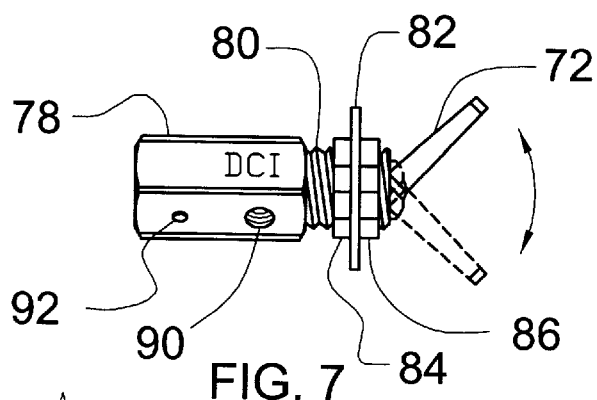
FIG. 7 is a pictorial illustration, partially broken away, of a typical valve assembly of the invention, in installed condition.
Figure 9:
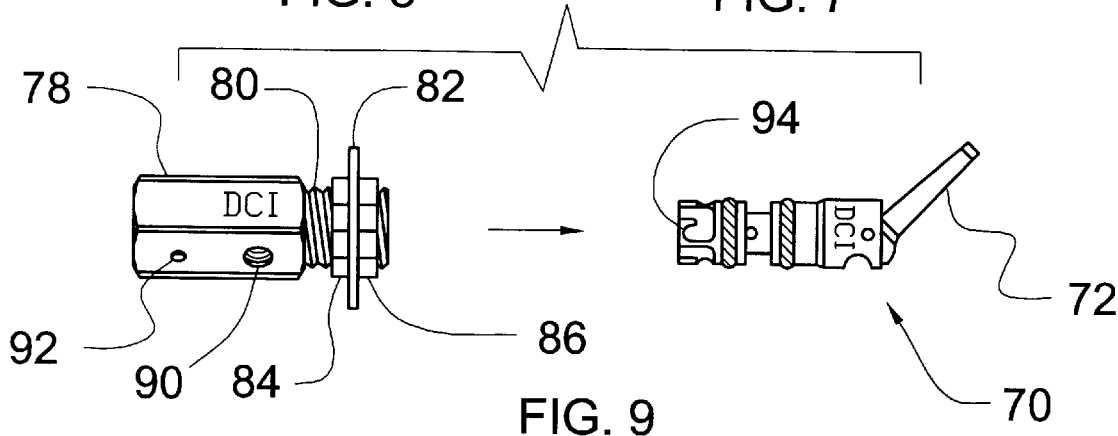
FIG. 9 is an exploded view of the assembly of FIGS. 7 and 8.
Figure 10:
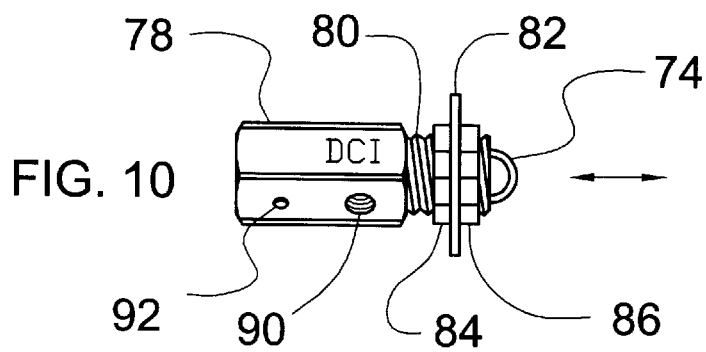
FIG. 10 is a pictorial view similar to FIG. 7 of an alternative embodiment.
Figures 11, 12:
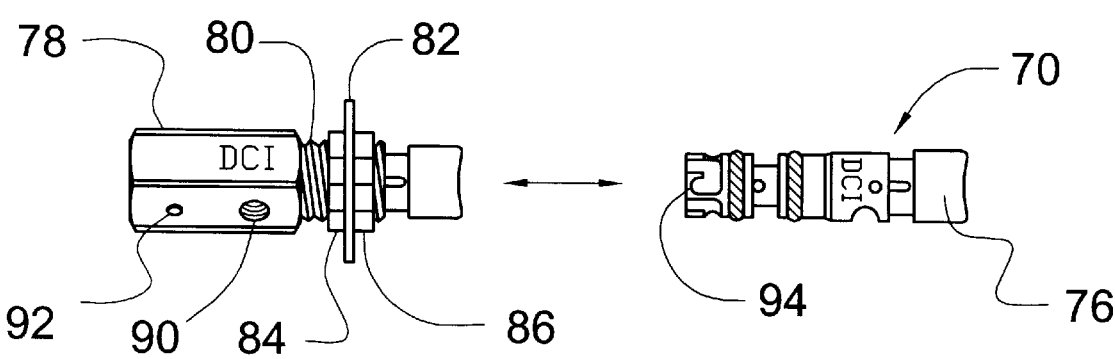
FIG. 11 is a pictorial view similar to FIGS. 7 and 10 of another alternative embodiment.
FIG. 12 is a pictorial view of the cartridge portion of the embodiment illustrated by FIG. 11.

The alternative embodiments illustrated by FIGS. 7 through 12 are similar to that illustrated by FIGS. 5 and 6, but differ in the details of construction which secure the valve assembly within a valve body. These figures illustrate three embodiments of a valve incorporating a core assembly, generally 70, of the invention. FIGS. 7, 10 and 11 illustrate substantially similar valves with toggle 72, roller 74 and push button 76 actuators, respectively. In each instance, a valve body 78 includes a threaded, proximal extension 80 inserted through an aperture in a panel 82, being held in place by jam nuts 84, 86, as shown. The body 78 includes a threaded inlet 88 and a threaded outlet 90. The hole 92 illustrated marks the location of an appropriate structural element (not visible) which extends inwardly to register with a selected locking groove 94 carried by the core 70. As illustrated, four locking grooves 94 are distributed evenly around the circumference of the core 70 at its distal end, so that the core assembly may be installed of any of four orientations. Accordingly, when a toggle actuator is present, the toggle may be oriented to open the valve when set to the top, bottom, left or right of the valve body.

A variety of core assemblies (cartridges) 70 may be interchangeably installed in a single valve body 78. The resulting valve may selectively include any of the actuators described by this disclosure or any equivalent. The core and body may be ported in various ways, depending upon the intended function of the valve. Various embodiments within contemplation may be either 2 way or 3 way in function, and in either case may be normally closed, normally open, momentary or ON/OFF (remaining in either condition in which it is placed). The valves may further be embodied in side ported or routing versions, as well as other configurations. In all events, the cartridges may be readily installed or removed from a valve body without tools. Moreover, the connecting fluid lines need not be disturbed when the cartridges are exchanged. The cartridges are preferably bayonet locked in place by "push (against spring bias)-turn-release" manipulation. A cartridge can similarly be removed by "push-turn-pull" manipulation. It is within contemplation to color code the cartridges according to their respective specific configurations.

Figure 13:
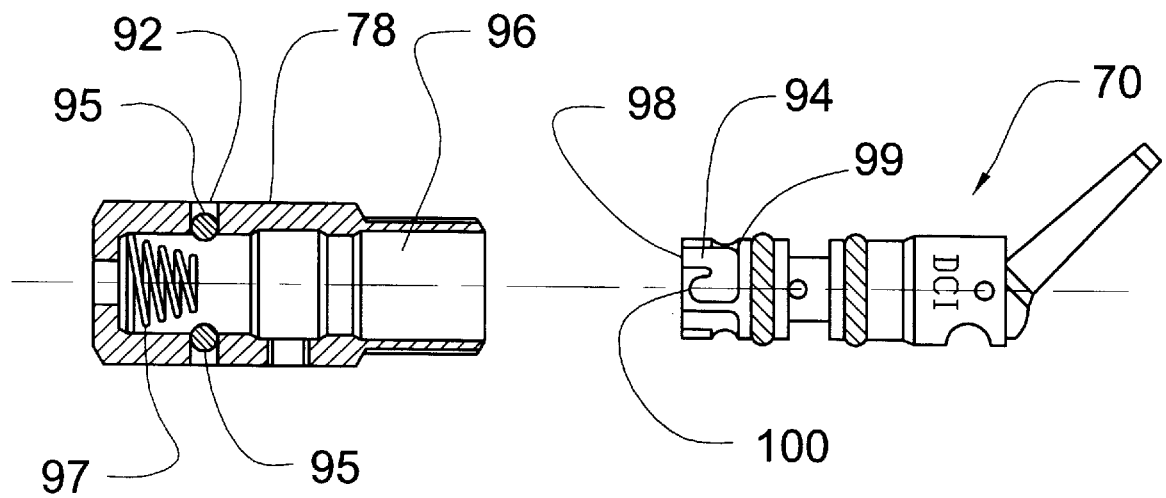
FIG. 13 is an exploded view, partially in section, illustrating the interconnection of a cartridge (core assembly) of this invention with a valve body of this invention.
Figure 14:
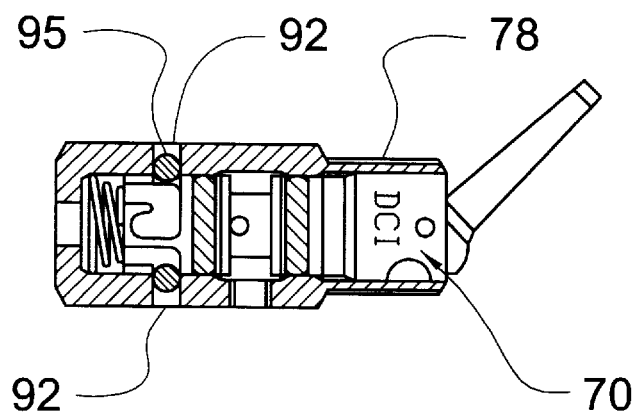
FIG. 14 is an assembly view, partially in section, illustrating the components of FIG. 13 in assembled condition.

Referring to FIGS. 13 and 14, a typical installation utilizes a pair of indexing balls 95 press fitted into holes 92 at opposite sides of a chamber 96 within a valve body. A core assembly 70 may be inserted into the chamber 96 against a return spring 97 with the distal end of the longer leg 98 of a "J"-shaped, bayonet locking groove (slot) 94 registered with each such ball 95. The cartridge 70 is pushed against the spring 97 until the balls 95 are situated within the transverse legs 99 of respective slots 94. The core is then rotated until the balls are situated at the proximal ends of shorter legs 100 of the slots 94. The core may then be released to permit the spring 97 to urge the core 70 outwardly with respect to the chamber 96 until the balls 95 are contacted by the distal ends of the shorter legs 100, as best illustrated by FIG. 14.

Although the appended claims define the invention with respect to certain features regarded as important to the invention, it is not intended to thereby limit the scope of the claims to the specific features illustrated by the drawings. One of ordinary skill in the art, reading this disclosure, will be enabled to practice the invention claimed through alternative equivalent structures.

What is claimed is:

1. In a cartridge valve comprising a core assembly mounted within a valve body having inlet and outlet ports, the improvement comprising providing structure associated with said core assembly and said body, respectively, whereby said core may be selectively installed in and removed from said body by sequential axial and radial movements of said core with respect to said body; wherein:

said core assembly has a proximal end carrying an actuator mechanism and a distal end inserted within a chamber of said valve body;

said core assembly includes a first coupling element and said valve body carries a second coupling element, said first and second coupling elements being structured and arranged to provide a bayonet locking attachment of said core assembly within said valve body;

said first coupling element comprises a locking groove opening to and is carried by said distal end and said second coupling element comprises a structural element configured to register with said locking groove; and said locking groove is shaped generally as a "J" with a long leg opening to said distal end, a transverse connecting leg at a proximal end of said long leg and a shorter leg spaced from said long leg and extending towards said distal end, said core assembly being mounted within said chamber by registering the distal end of said long leg with said structural element, pushing said core assembly until said structural element is positioned within said transverse leg, turning said core assembly until said structural element registers with said shorter leg and causing said core assembly to move outwardly with respect to said chamber, whereby to register said structural element with said shorter leg towards said distal end.

2. The improvement according to claim 1, wherein said structural element comprises an indexing ball carried within a recess in the wall of said chamber.

3. In a cartridge valve comprising a core assembly mounted within a valve body having inlet and outlet ports, the improvement comprising providing structure associated with said core assembly and said body, respectively, whereby said core may be selectively installed in and removed from said body by sequential axial and radial movements of said core with respect to said body; wherein:

said core assembly has a proximal end carrying an actuator mechanism and a distal end inserted within a chamber of said valve body;

said core assembly includes a first coupling element and said valve body carries a second coupling element, said first and second coupling elements being structured and arranged to provide a bayonet locking attachment of said core assembly within said valve body;

said first coupling element comprises a locking groove opening to and is carried by said distal end and said second coupling element comprises a structural element configured to register with said locking groove; and said distal end carries a plurality of circumferentially spaced, "J"-shaped locking grooves structured and arranged such that at least one such groove will engage said second coupling mechanism when said core is rotated to any of a plurality of selected rotated positions with respect to said chamber.

4. The improvement according to claim 3, wherein said distal end caries four, evenly spaced said locking grooves, and said second coupling mechanism comprises two structural elements projecting inwardly from the wall of said chamber to register with alternate said grooves.

5. A cartridge valve, comprising:

a body element having a distal end, a proximal end, an internal chamber defined by a chamber wall opening through said proximal end, an inlet port in open communication with said chamber and an outlet port spaced from said inlet port and in open communication with said chamber, wherein said chamber has a proximal end comprising said chamber wall opening;

a cartridge element, shaped and dimensioned for installation within said chamber, said cartridge element having a distal end and a proximal end carrying an actuator mechanism, a first sealing means disposed between said chamber wall and said cartridge element between said inlet port and said outlet port, respectively, said first sealing means maintaining a seal between said chamber wall and said cartridge element during actuation of said valve, and second sealing means disposed between said chamber wall and said cartridge element in a position to isolate both said inlet and outlet ports from said proximal end of said chamber; and a bayonet locking system coupling said body element to said cartridge element, said locking system being structured and arranged to require push-turn-release manipulations of said cartridge element with respect to said chamber to install said cartridge element within said chamber and push-turn-pull manipulations of said cartridge element with respect to said chamber to remove said cartridge element from said chamber.

6. A cartridge valve according to claim 5, wherein said bayonet locking system is structured and arranged to couple said cartridge element to said body element when said cartridge element is oriented in any of a plurality of selected rotated positions with respect to said chamber.

7. A cartridge valve according to claim 5, wherein said actuator is operable between an ON position, which provides a fluid flow path between said inlet port and said outlet port through said cartridge element and an OFF position, which blocks fluid flow through said cartridge element.

8. A cartridge valve according to claim 5, including a plurality of interchangeable cartridge elements.

9. A cartridge valve according to claim 8, wherein individual cartridge elements of said plurality of cartridge elements are distinct in at least one of actuation mechanism or internal configuration such that replacing one such cartridge element with another modifies the specific operation of said valve.

10. A cartridge valve according to claim 5, wherein said body element includes an extension at its proximal end configured to enable mounting of said valve to a panel by means of jam nuts.

* * * * *